(12) United States Patent
Thibault

(10) Patent No.: US 7,280,735 B2
(45) Date of Patent: Oct. 9, 2007

(54) COMBINED OPTICAL FIBER WHEEL, BEAMSPLITTER, SWITCH, AND LOGIC GATE

(76) Inventor: Andre Sean Thibault, 938 E. Swan Creek Rd., #311, Fort Washington, MD (US) 20744

( * ) Notice: Subject to any disclaimer, the term of this patent is extended or adjusted under 35 U.S.C. 154(b) by 58 days.

(21) Appl. No.: 11/145,912

(22) Filed: Jun. 6, 2005

(65) Prior Publication Data

US 2005/0271351 A1    Dec. 8, 2005

Related U.S. Application Data

(60) Provisional application No. 60/577,524, filed on Jun. 7, 2004.

(51) Int. Cl.
*G02B 6/00* (2006.01)
*G02B 26/02* (2006.01)
*G02B 21/36* (2006.01)

(52) U.S. Cl. ............... 385/147; 359/234; 359/236; 385/31; 385/33; 396/432; 396/544

(58) Field of Classification Search ............ 385/147, 385/31, 33; 396/307, 432, 544; 353/84; 359/227, 234, 236, 419, 503, 722, 723; 348/360, 348/361
See application file for complete search history.

(56) References Cited

U.S. PATENT DOCUMENTS 3,861,788 A    1/1975    Webster
4,084,909 A    4/1978    Mathisen
4,176,916 A    12/1979   Carpenter
4,448,500 A    5/1984    Marling
4,738,535 A    4/1988    Webster
4,811,258 A    3/1989    Andersen
4,923,269 A    5/1990    Healey
4,930,883 A *  6/1990    Salzman ................ 359/419
5,335,082 A    8/1994    Sable
5,371,543 A    12/1994   Anderson
5,508,844 A    4/1996    Blake
5,748,812 A    5/1998    Buchin
6,498,682 B2   12/2002   Glance
6,567,225 B1 * 5/2003    Derian .................. 359/892

OTHER PUBLICATIONS

Ron Wodaski, The New CCD Astronomy, 2002, New Astronomy, 322-323 and 328-329.*
Ron Wodaski, The New CCD Astronomy, 2002, pp. 78-80, 322-323, and 328-330, New Astronomy Press, Duvall, WA, USA.
Julian Brown, The Quest for the Quantum Computer, 2000, pp. 61-71, Touchstone, New York, NY, USA.
Scopetronix website, www.scopetronix.com/guiders.htm, print of webpage on Jul. 16, 2005.
Meade Inc. website, www.meade.com/catalog/pictor/616clr.html, print of webpage on Jul. 16, 2005.
Meade Inc. website, www.meade.com/dsipro/, print of webpage on Jul. 16, 2005.

* cited by examiner

*Primary Examiner*—Kevin S Wood
*Assistant Examiner*—John M Bedtelyon

(57) ABSTRACT

A machine that can pass, reflect, filter, or block light along multiple paths. The specific portions of light that can be passed, reflected, blocked, or filtered, are controlled by an optical routing subassembly. This optical routing subassembly can be manipulated to direct specific portions of light to specific paths.

6 Claims, 4 Drawing Sheets

COMBINED OPTICAL FIBER WHEEL, BEAMSPLITTER, SWITCH, AND LOGIC GATE

RELATED APPLICATIONS

The present application is a continuation application of U.S. provisional patent application, Ser. No. 60/577,524, filed Jun. 7, 2004, included by reference herein and for which benefit of the priority date is hereby claimed.

FIELD OF THE INVENTION

The present invention relates to optics, optical systems, telecommunications, photonics, and computation.

BACKGROUND OF THE INVENTION

There is a need for mechanisms that provide for high resolution imaging and tracking. There is also a need for mechanisms that provide for optical routing and switching. Additionally, there is a need for mechanisms that facilitate optical computation.

Relevant prior art includes:

| | | | |
|---|---|---|---|
| U.S. Pat. No. 3861788 | January, 1975 | Webster | 359/889 |
| U.S. Pat. No. 4084909 | April, 1978 | Mathisen | 356/332 |
| U.S. Pat. No. 4176916 | December, 1979 | Carpenter | 359/589 |
| U.S. Pat. No. 4448500 | May, 1984 | Marling | 359/503 |
| U.S. Pat. No. 4738535 | April, 1988 | Webster | 356/418 |
| U.S. Pat. No. 4930883 | June, 1990 | Salzman | 359/419 |
| U.S. Pat. No. 5335082 | August, 1994 | Sable | 347/232 |
| U.S. Pat. No. 5371543 | December, 1994 | Anderson | 348/270 |
| U.S. Pat. No. 5508844 | September, 1994 | Blake | 359/503 |
| U.S. Pat. No. 5748812 | May, 1998 | Buchin | 385/018 |
| U.S. Pat. No. 6498682 | December, 2002 | Glance | 359/578 |
| U.S. Pat. No. 6567225 | May, 2003 | Derian | 359/892 |

Other Publications:
Ron Wodaski, The New CCD Astronomy, 2002, The New Astronomy Press, pp. 78-80, 322-323, 328-330
Julian Brown, The Quest for the Quantum Computer, 2000, Touchstone, pp. 61-71

Prior art suffers from a number of disadvantages:
(a) different devices are required to be used to perform all of the desired functions;
(b) cost is increased when requiring several devices to perform the desired functions;
(c) an increased number of devices in an optical system can cause an increased and unwanted amount of flexure in the optical system;
(d) an increased number of devices in an optical system can cause an unwanted lengthening of the light path in the optical system;
(e) on-axis optical guiding is not achieved;
(f) simultaneous imaging and optical guiding from the whole field is not achieved;
(g) switching from imaging mode to viewing mode may require a component of the device to be physically moved;
(h) existing optical switches are not highly configurable;
(i) optical logic gates with reversible and conservative properties are not yet commercially practical; and
(j) electronic logic gates are susceptible to electromagnetic radiation interference.

Objects and Advantages

Accordingly, besides the objects and advantages of the optical filter wheel, beamsplitter, switch, and logic gate described above, some of the objects and advantages of the present invention are:
(a) to combine several prior mechanisms in a new and unique way;
(b) to reduce the number of components required and thereby reduce cost;
(c) to reduce the number of components and thereby reduce unwanted flexure in an optical system;
(d) to reduce the number of components and thereby reduce the length of the light path in an optical system;
(e) to allow simultaneous imaging and tracking or viewing of the entire field of view of the image or light source and allow on-axis guiding;
(f) to allow simultaneous dual output imaging or tracking or viewing within a single system;
(g) to allow simultaneous imaging and tracking or viewing, without the need for components to be moved to switch from imaging to tracking mode or vice versa, thereby reducing vibrations, movement and flexure in the system;
(h) to provide a device that can route or switch, in a tunable manner, specific portions of light to specific and multiple outputs;
(i) to assist in the creation of an optical logic gate with reversible and conservative properties for use in quantum computing; and
(j) to assist in the creation of a logic gate that is immune to electrical or magnetic interference.

It is therefore an object of the invention to provide an improved mechanism to facilitate high resolution imaging and tracking.

It is another object of the invention to provide a mechanism to facilitate optical routing and switching for network telecommunications.

It is another object of the invention to provide a mechanism to facilitate optical computation.

Other objects and advantages will become apparent from a consideration of the drawings and ensuing description in this application.

BRIEF DESCRIPTION OF THE DRAWINGS

A complete understanding of the present invention may be obtained by reference to the accompanying drawings, when considered in conjunction with the subsequent, detailed description, in which.

Drawings—Reference Numerals

10—main housing
12—primary tube
14—secondary tube
16—tertiary tube
18—optical routing subassembly
20—red interference filter
22—green interference filter 24—blue interference filter
26—full reflective mirror
28—axle
30—rotator
32—main housing side wall
34—maintenance access door
36—cyan interference filter
38—magenta interference filter
40—yellow interference filter
42—infrared interference filter For purposes of clarity and brevity, like elements and components will bear the same designations and numbering throughout the FIGURES.

SUMMARY OF THE INVENTION

In accordance with the present invention, there is provided a machine that can pass, reflect, filter, or block light along multiple paths. The specific portions of light that can be passed, reflected, blocked, or filtered, are controlled by an optical routing subassembly. This optical routing subassembly can be manipulated to direct specific portions of light to specific paths.

DESCRIPTION OF THE PREFERRED EMBODIMENT

Figure 1:
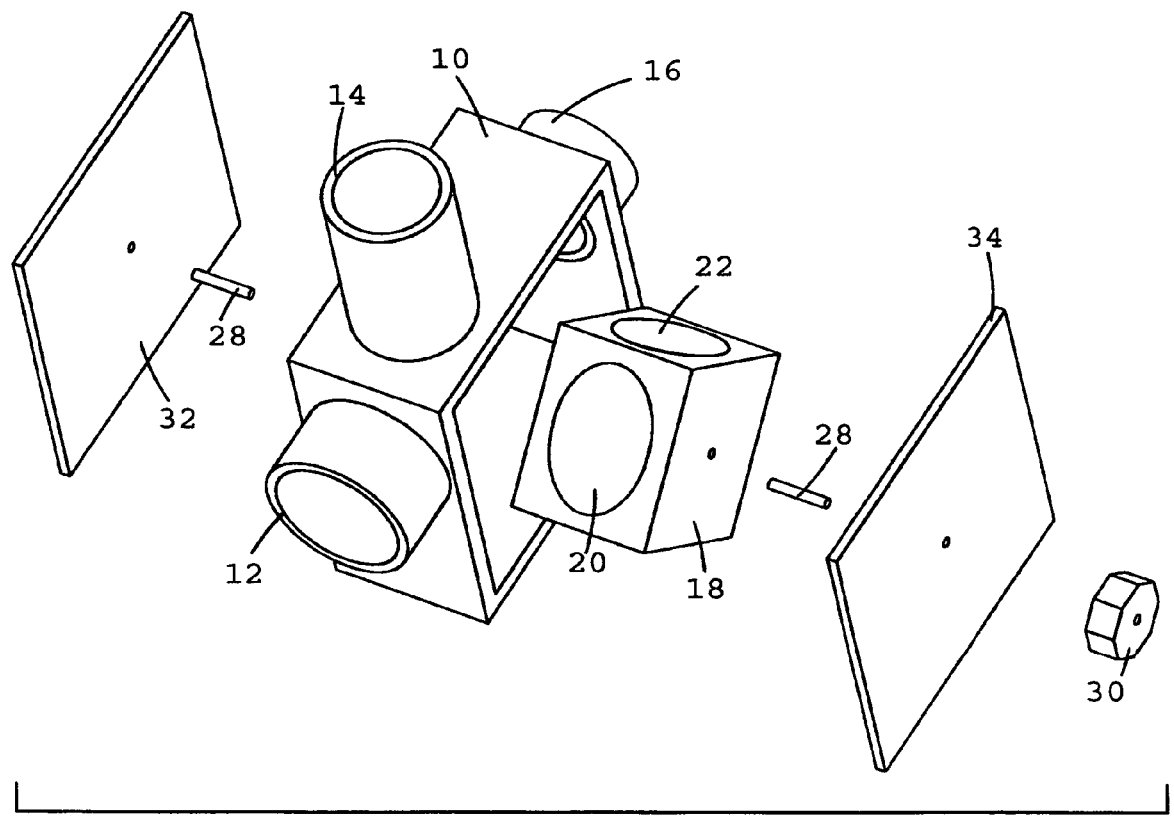
FIG. 1 is an exploded perspective view of an exemplary embodiment of the present invention.
Figure 2:
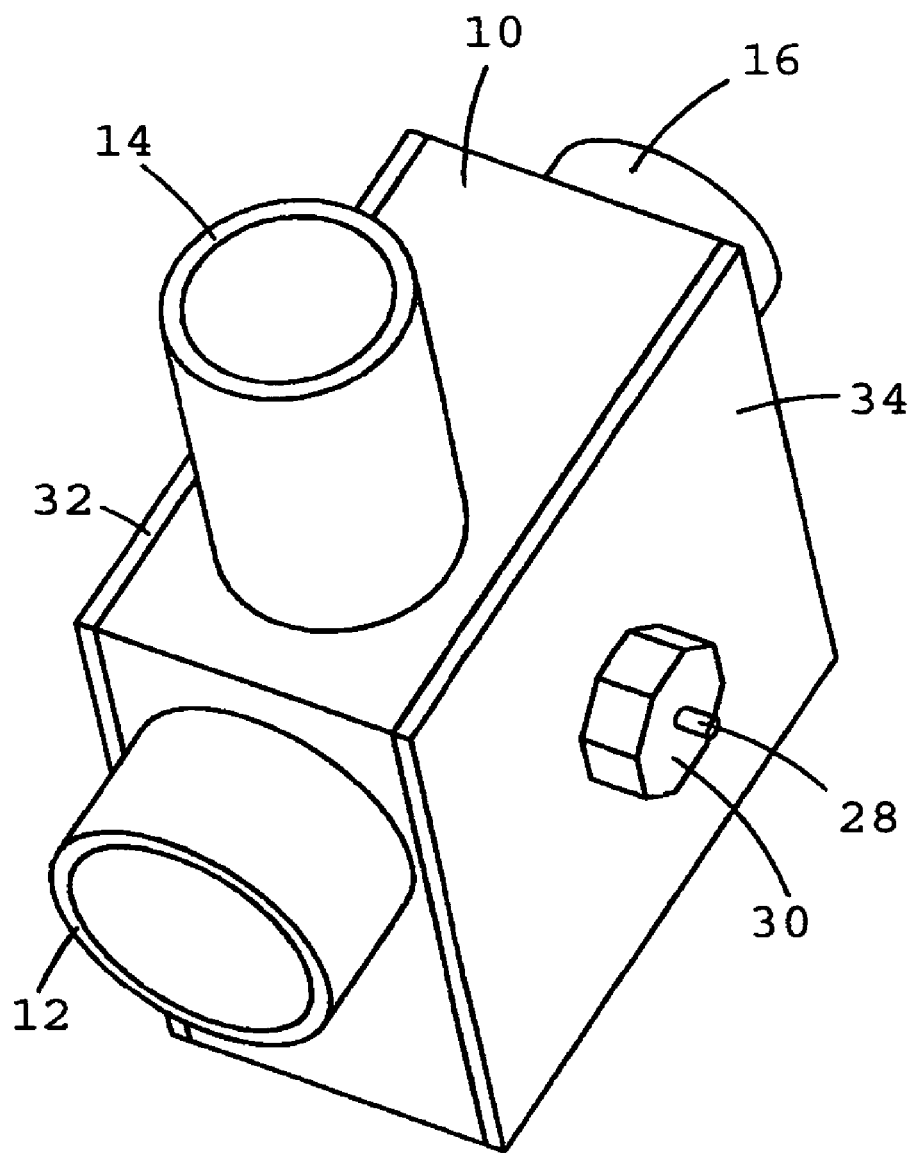
FIG. 2 is a perspective view of an exemplary embodiment of the present invention.

FIG. 1 is an exploded perspective view of an exemplary embodiment of the present invention. FIG. 2 is a perspective view of an exemplary embodiment of the present invention. As shown in FIGS. 1 and 2, the combined optical filter wheel, beamsplitter, switch, and logic gate is composed of a main housing 10, a primary tube 12, a secondary tube 14, a tertiary tube 16, and an optical routing subassembly 18. Said optical routing subassembly 18 is composed of a sub-housing constructed to hold filters and mirrors including a red interference filter 20, a green interference filter 22, a blue interference filter 24, a full reflective mirror 26, and an axle 28. Attached to axle 28 is a rotator 30 to facilitate rotation of optical routing subassembly 18. Optical routing subassembly 18 can be rotated to four different positions. Each rotational position of optical routing subassembly 18 places a different optic into the light path such that the angle of incidence of the light to the optics is forty-five degrees. There is also a main housing side wall 32 and a maintenance access door 34 to facilitate removing or swapping optical routing subassembly 18.

Figure 3:
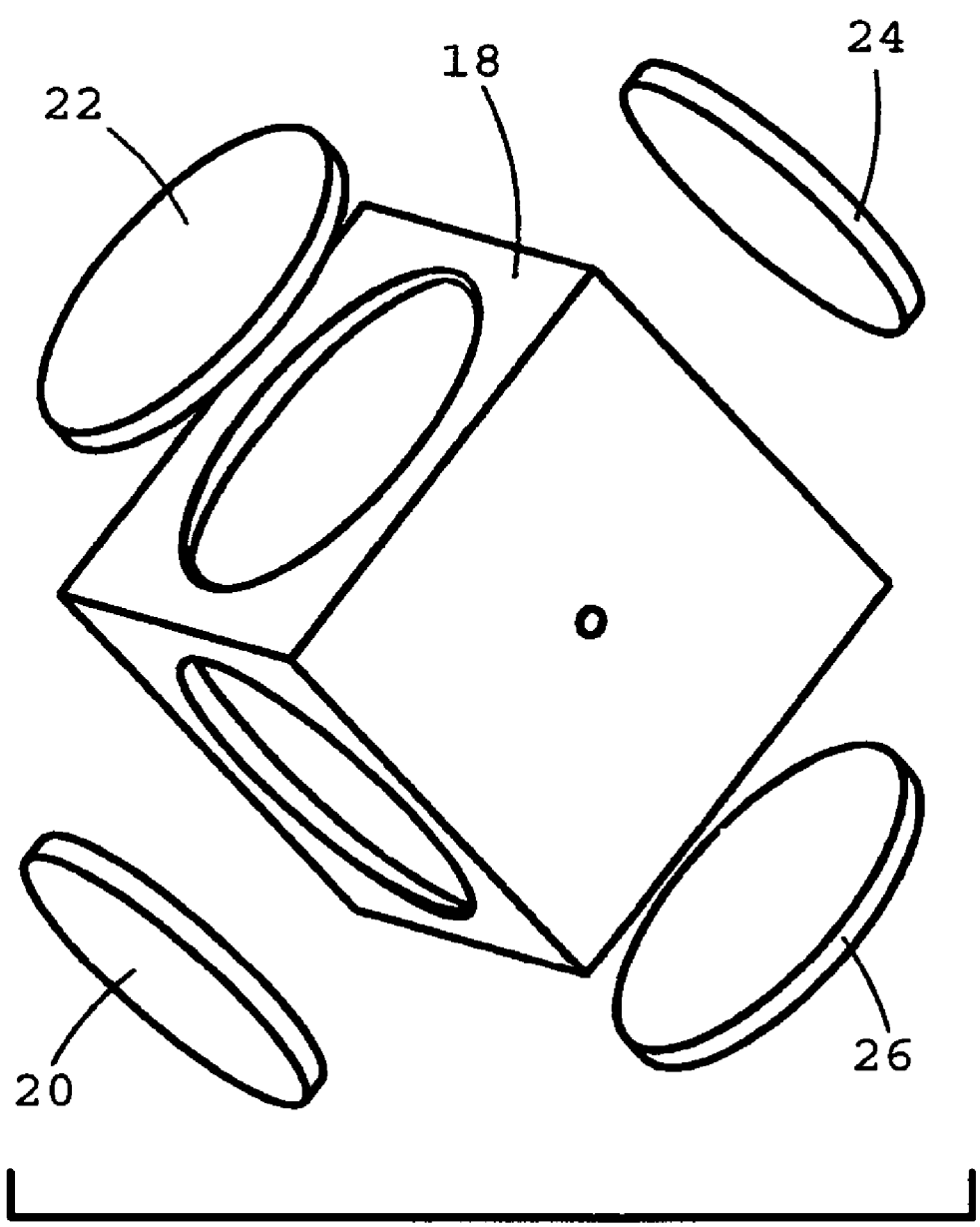
FIG. 3 is an exploded perspective view of an exemplary embodiment of the optical routing subassembly.

FIG. 3 is an exploded perspective view of an exemplary embodiment of optical routing subassembly 18. Optical routing subassembly 18 includes mirrors or filters that may be composed of varying materials that will selectively reflect, transmit or block specific frequencies of light. FIG. 3 includes said full reflective mirror 26, and three different dichroic mirror filters, including said red interference filter 20, said green interference filter 22, said blue interference filter 24, and said axle 28.

Alternative Embodiments

Figure 4:
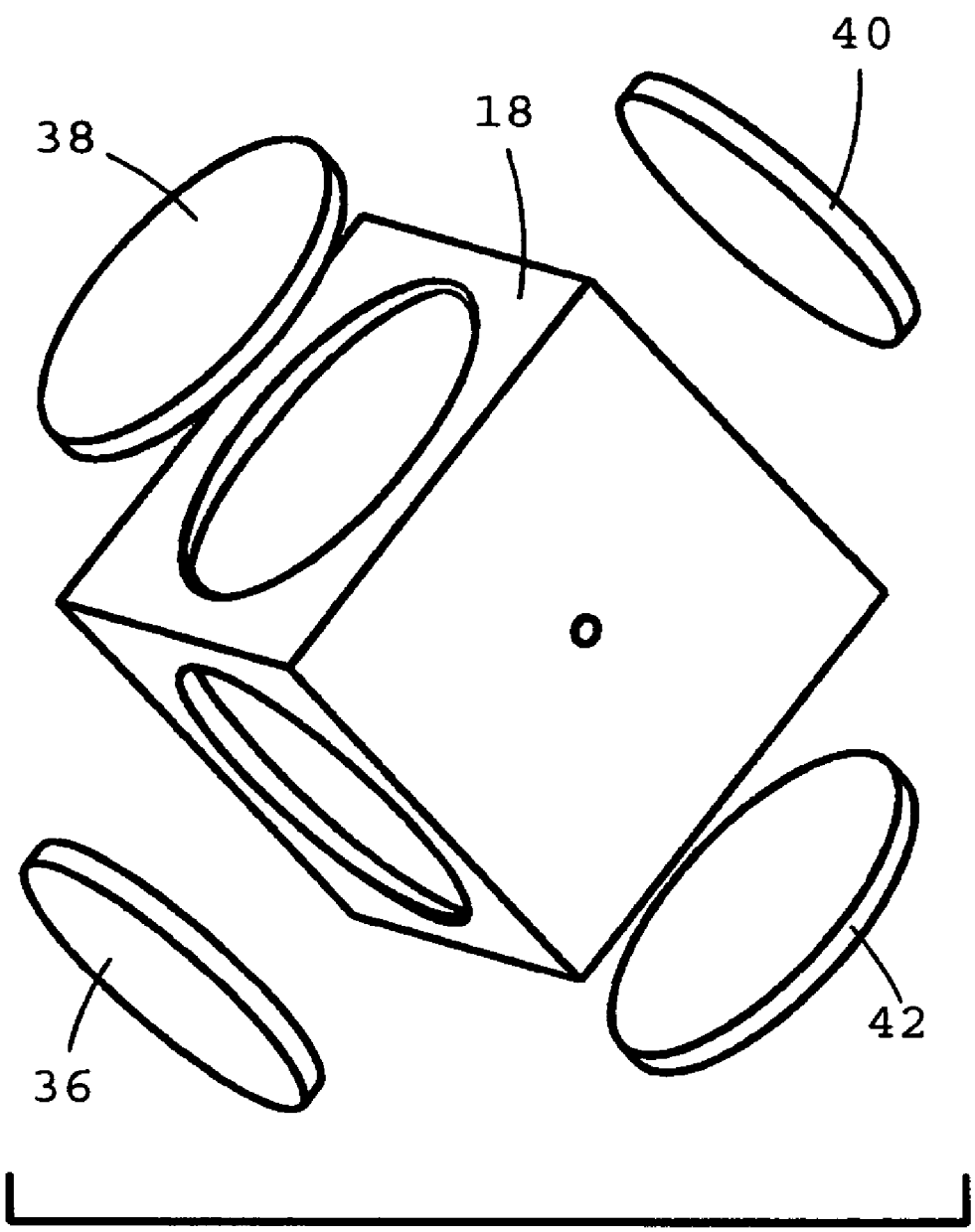
FIG. 4 is an exploded perspective view of an alternative embodiment of the optical routing subassembly.

FIG. 4 is an exploded perspective view of an alternative embodiment of optical routing subassembly 18. Optical routing subassembly 18 includes mirrors or filters that may be composed of varying materials that will selectively reflect, transmit or block specific frequencies of light. FIG. 4 includes an infrared interference filter 42, and three different dichroic mirror filters, including a cyan interference filter 36, a magenta interference filter 38, a yellow interference filter 40, and said axle 28.

Alternatively, optical routing subassembly 18 can house various different types of dichroic mirrors, filters, mirrors, prisms, retroreflectors, polarizers, or masks, where appropriate for the desired use. A differently configured optical routing subassembly 18 could be removed from and swapped into main housing 10. Optical routing subassembly 18 could alternatively be of a differing shape to support more or fewer dichroic mirrors, filters, mirrors, prisms, retroreflectors, polarizers, masks, or outputs. A mask could be used as a shutter to block all light. When used as an optical logic gate in quantum computing environments, an additional tube and opening could be incorporated into main housing 10. The mechanism of the invention may be constructed to various sizes to facilitate compatibility to existing optical components.

Operation:

When the present invention is used for high resolution imaging, a conventional monochrome charge-coupled device (CCD) camera (not shown) or a conventional camera (not shown) is placed in secondary tube 14. A conventional guiding eyepiece (not shown) or a second conventional monochrome CCD camera (not shown) is placed in tertiary tube 16. Light enters primary tube 12 and then interacts with optical routing subassembly 18. Optical routing subassembly 18 is adjusted by either manual or motorized rotation of rotator 30 to reflect the desired wavelengths of light to secondary tube 14 and thence to said conventional monochrome CCD camera or said conventional camera. Simultaneously, optical routing subassembly 18 will also pass a differing frequency of light to tertiary tube 16 and thence to said conventional guiding eyepiece or said conventional monochrome CCD camera. Said conventional guiding eyepiece or said conventional monochrome CCD camera is used to help facilitate keeping the image centered or fixed in the field of view while taking a long exposure photograph or image. Once this image is taken, another image may be taken in a differing desired frequency of light by rotating optical routing subassembly 18 to a different position. This places a different optic such as red interference filter 20, green interference filter 22, blue interference filter 24, or full reflective mirror 26 into the light-path. This process can be repeated to obtain images or photographs in various frequencies of light. Typically three or four images or photographs will be taken in different frequencies of light. These images or photographs may then be combined to produce one high resolution multi-color image.

When the present invention is used for optical switching or routing in a network communications system, incoming light interacts with optical routing subassembly 18 which is then rotated by an external device manipulating rotator 30 to direct the desired frequencies of light to the desired outputs. Information conveyed via specific frequencies of light is transmitted, reflected, polarized, switched, routed, or blocked by the particular orientation and configuration of optical routing subassembly 18. This routing or switching of specific frequencies of light to various outputs may be used as a mechanism to route or switch computer network or communications traffic, including data, video, audio, or voice.

When the present invention is used as an optical logic gate in computation, incoming light interacts with optical routing subassembly 18 which is then rotated by an external device manipulating rotator 30 to direct the desired light inputs to the desired output tube, or output tubes. Information conveyed via specific frequencies of light is transmitted, reflected, polarized, switched, routed, or blocked by the particular orientation and configuration of optical routing subassembly 18. This routing or switching of specific frequencies or polarizations of light to specific outputs may be used as a technique to perform logic gate functions (e.g. AND, OR) through the actions of mirrors, filters, or polarizers, and thence to send calculated information to a particular output. Multiple quantities of the combined optical filter wheel, beamsplitter, switch, and logic gate may be chained in series to respective primary tube 12, secondary tube 14 or tertiary tube 16 to facilitate the performance of additional calculations or functions.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A combined optical filter wheel, beam splitter, switch, and logic gate for a machine that can changeably pass, reflect, filter, or block light along multiple paths, comprising:

a main housing, for providing a frame;

a primary tube mounted to the exterior of said main housing, for providing a structured opening for light to pass and providing a structure to hold attachments, rigidly or threadably connected to said main housing, wherein said primary tube has a first central axis;

a secondary tube mounted to the exterior of said main housing, for providing a structured opening for light to pass and providing a structure to hold attachments, rigidly or threadably attached to said main housing, wherein said secondary tube has a second central axis;

a tertiary tube mounted to the exterior of said main housing, for providing a structured opening for light to pass and providing a structure to hold attachments, rigidly or threadably attached to said main housing, wherein said tertiary tube has a third central axis;

said main housing arranged so that said primary tube and said tertiary tube are aligned so that said first and third central axes are coincident along a primary axis, and said secondary tube is aligned so that said second central axis is perpendicular to said primary axis;

an optical routing subassembly, for providing a sub-housing for mounting a plurality of optics, rotatably attached to within said main housing wherein said optical routing subassembly is rotatable about a secondary axis, wherein said secondary axis is perpendicular to a plane defined by said primary axis and the second central axis of said secondary tube, wherein said optical routing subassembly is aligned so that light passing through said primary tube is incident upon at least one of the plurality of optics so that a portion of the light is selectively reflected through said secondary tube and the remaining portion of light is transmitted through said tertiary tube;

at least one axle, for providing an attachment from optical routing subassembly to said main housing while allowing said optical routing subassembly to rotate about said secondary axis;

a rotator connected to said at least one axle, for rotating said optical routing subassembly about said secondary axis.

2. The combined optical filter wheel, beam splitter, switch, and logic gate as recited in claim 1, wherein said main housing further comprises a maintenance access door to facilitate removing or swapping said optical routing subassembly with a differently configured optical routing subassembly, removably attached to said main housing.

3. The combined optical filter wheel, beam splitter, switch, and logic gate as recited in claim 1, wherein said optical routing subassembly further comprises:

a red interference filter, a green interference filter and a blue interference filter.

4. The combined optical filter wheel, beam splitter, switch, and logic gate as recited in claim 1, wherein said optical routing subassembly further comprises:

a cyan interference filter, a magenta interference filter and a yellow interference filter.

5. The combined optical filter wheel, beam splitter, switch, and logic gate as recited in claim 1, wherein said optical routing subassembly further comprises:

at least one infrared interference filter.

6. The combined optical filter wheel, beam splitter, switch, and logic gate as recited in claim 1, wherein said optical routing subassembly further comprises:

at least one full reflective mirror.

* * * * *

UNITED STATES PATENT AND TRADEMARK OFFICE
CERTIFICATE OF CORRECTION

PATENT NO. : 7,280,735 B2 Page 1 of 1
APPLICATION NO. : 11/145912
DATED : October 9, 2007
INVENTOR(S) : Andre Sean Thibault It is certified that error appears in the above-identified patent and that said Letters Patent is hereby corrected as shown below:

On the title page, item [54] and Col. 1, Line 1-3 the correct title of invention is:
COMBINED OPTICAL FILTER WHEEL, BEAMSPLITTER, SWITCH, AND LOGIC GATE On the title page, item [76] the correct information is:
Inventor: Andre Sean Thibault, 3527 Mt. Diablo Blvd. #358, Lafayette, CA (US) 94549

Signed and Sealed this

Eighteenth Day of December, 2007

JON W. DUDAS
*Director of the United States Patent and Trademark Office*